United States Patent
Barber

(10) Patent No.: US 9,043,051 B1
(45) Date of Patent: May 26, 2015

(54) EVENT-BASED FLIGHT MANAGEMENT SYSTEM, DEVICE, AND METHOD

(71) Applicant: Sarah Barber, Cedar Rapids, IA (US)

(72) Inventor: Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 94 days.

(21) Appl. No.: 13/743,614

(22) Filed: Jan. 17, 2013

(51) Int. Cl.
    *G01C 23/00* (2006.01)
    *B64C 19/00* (2006.01)
    *G08G 5/00* (2006.01)

(52) U.S. Cl.
    CPC ............. *G01C 23/00* (2013.01); *B64C 19/00* (2013.01); *G08G 5/0021* (2013.01); *G08G 5/003* (2013.01); *G08G 5/0052* (2013.01); *G01C 23/005* (2013.01)

(58) Field of Classification Search
    CPC .... G01C 23/00; G01C 23/005; G08G 5/0021; G08G 5/003; G08G 5/0052; B64C 19/00
    USPC .......................... 701/3, 11; 340/971, 973, 979
    See application file for complete search history.

(56) References Cited

U.S. PATENT DOCUMENTS

| | | | |
|---|---|---|---|
| 6,542,796 B1 * | 4/2003 | Gibbs et al. .................... | 701/3 |
| 6,946,976 B1 * | 9/2005 | Langner et al. ............... | 340/971 |
| 7,787,999 B1 * | 8/2010 | Barber ............................ | 701/14 |
| 8,467,966 B2 * | 6/2013 | Barnetche et al. ............ | 701/532 |
| 8,694,184 B1 * | 4/2014 | Boorman et al. .............. | 701/3 |
| 2008/0103641 A1 * | 5/2008 | Ratcliffe ........................ | 701/3 |
| 2009/0062972 A1 * | 3/2009 | Boorman et al. .............. | 701/3 |
| 2010/0106346 A1 * | 4/2010 | Badli et al. .................... | 701/3 |
| 2010/0332054 A1 * | 12/2010 | Brandao et al. ................ | 701/3 |

OTHER PUBLICATIONS

Garmin, StreetPilot 2610/2650 portable car navigation operating instructions, Jul. 2003, p. 17.*

* cited by examiner

*Primary Examiner* — Tuan C. To
*Assistant Examiner* — Donald J Wallace
(74) *Attorney, Agent, or Firm* — Angel N. Gerdzhikov; Donna P. Suchy; Daniel M. Barbieri

(57) ABSTRACT

Present novel and non-trivial system, device, and method for generating and presenting one or more flight management strips on a visual display unit are disclosed. An event generator ("EG") is configured to receive flight management data representative of one or more future vertical mode actions or future lateral mode actions, generate event data representative of one or more flight management strips, and provide the event data to a presentation system for the subsequent display of flight management strip(s). Each future vertical mode action may be comprised of a vertical FMS event or a speed/thrust FMS event, and each future lateral mode action may be comprised of a lateral FMS event. Also, each flight management strip could be informative of one FMS event and comprised of at least one commencement time row and one FMS event row for displaying time and event information, respectively.

17 Claims, 6 Drawing Sheets

EVENT-BASED FLIGHT MANAGEMENT SYSTEM, DEVICE, AND METHOD

BACKGROUND OF THE INVENTION

1. Field of the Invention

This invention pertains generally to the field of aircraft display units that present flight information to the pilot or flight crew of an aircraft.

2. Description of the Related Art

In present-day aircraft operations, whenever a flight management system ("FMS") is an active source of navigation information, pilots have the ability to integrate information from several sources in order to understand how the aircraft is operating now and how it will operating next. For example, a primary flight display ("PFD") could display current lateral, vertical, and speed/thrust flight modes, armed lateral and vertical flight modes, an FMS flight plan target altitude, and an FMS target airspeed. An FMS route window or "legs" page could display cumulative or leg distance to each waypoint, time to each waypoint, altitude and speed constraints at each waypoint (if any exists), and an FMS calculated altitude at each waypoint. A vertical situation display could display any existing altitude constraints, a top of climb ("TOC") indication, and a top of descent ("TOD") indication.

Even if the pilot is successful in scanning and integrating all of the above information presented in different locations in the cockpit, he or she may not know exactly when the aircraft will perform its next maneuver. For example, turn anticipation of a fly-by the waypoint will commence prior to the aircraft actually reaching the waypoint. Also contributing to the pilots' workload in comprehending the aircraft's current and future states is a proliferation of Vertical Navigation ("VNAV") sub-modes. In addition to "getting behind the aircraft," the inability of the pilot to maintain situational awareness of what the FMS is doing may lead to pilot to ask the classic question, "Why did the aircraft do that?"

Generally, the issue is not "what" the aircraft did, for a pilot may infer an answer from the sources of information discussed above. Instead, the issue may be "why" the aircraft did something at a certain point in time, thereby indicating a possible loss of temporal awareness of upcoming route and/or flight mode changes on the part of the pilot.

BRIEF SUMMARY OF THE INVENTION

The embodiments disclosed herein present a novel and non-trivial event-based flight management system, device, and method for generating and presenting one or more flight management strips on a visual display unit. With the embodiments disclosed herein, a sequence of FMS event strips may be presented to the pilot so that he or she may be informed of the next action, allowing him or her to maintain good temporal awareness and/or situational awareness of both the current and future state of the aircraft.

In one embodiment, the event-based flight management system is disclosed. The system may be comprised of an FMS, an event generator ("EG"), and a presentation system. In an additional embodiment, the system could be further comprised of a pilot interface system.

In another embodiment, the event-based flight management device is disclosed. The device could be the EG programmed or configured with the method discussed in the following paragraph.

In another embodiment, the event-based flight management method is disclosed. The method could be comprised of receiving flight management data representative of one or more future vertical mode actions or future lateral mode actions, generating event data representative of one or more flight management strips, and providing the event data to the presentation system for the subsequent display of the flight management strips represented in the event data. Each future vertical mode action may be comprised of a vertical FMS event or a speed/thrust FMS event, and each future lateral mode action may be comprised of a lateral FMS event. Each flight management strip could be informative of one FMS event and comprised of at least a commencement time row and an FMS event row for displaying time and event information, respectively. The commencement time row may or may not display commencement time information (i.e., the time information is left blank), depending on whether time information is available or whether its commencement time is the same time at which another FMS event is commenced. A mode indicator row may also be included in the flight management strip, thereby informing the pilot of a future vertical or a future lateral mode.

DETAILED DESCRIPTION OF THE INVENTION

In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
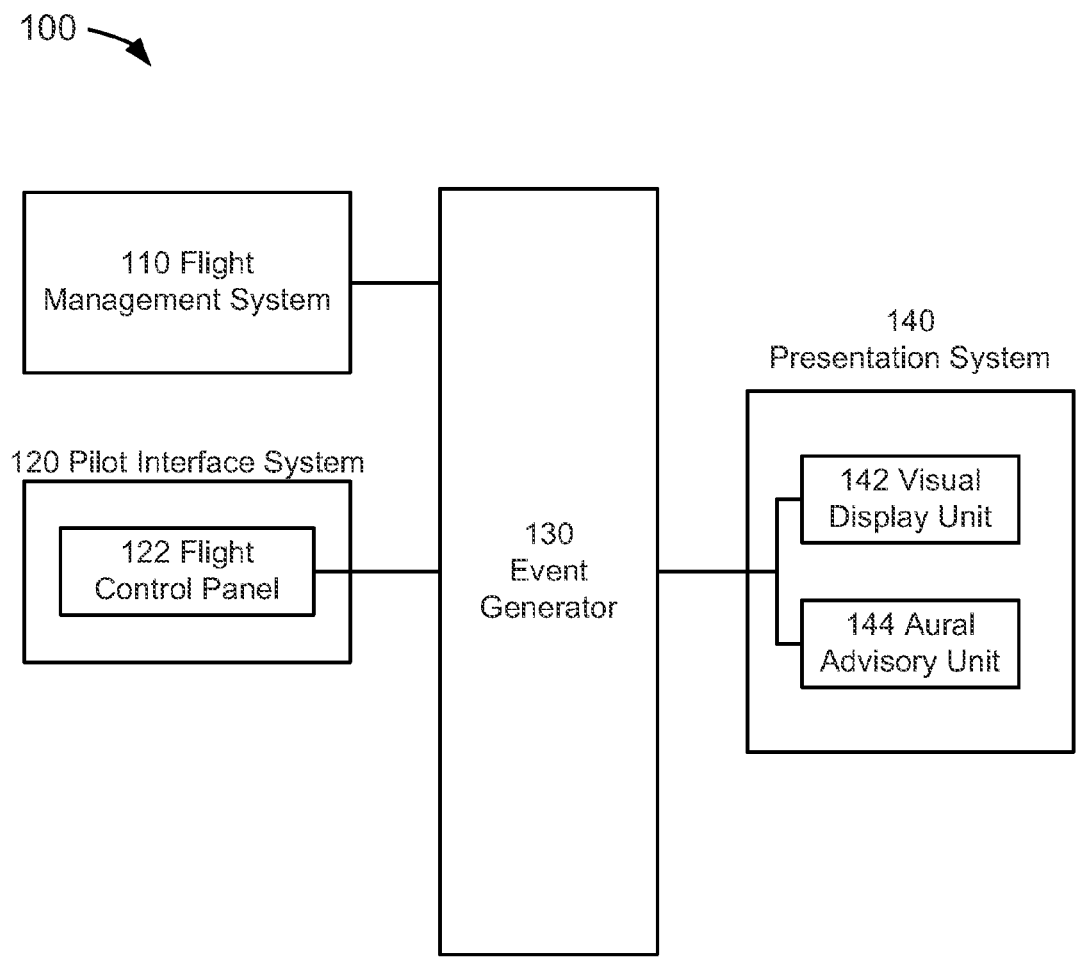
FIG. 1 depicts a block diagram of an event-based flight management system.

FIG. 1 depicts a block diagram of an event-based flight management system suitable for implementation of the techniques described herein. The event-based flight management system 100 of an embodiment of FIG. 1 includes flight management system ("FMS") 110, a pilot interface system 120, an event generator ("EG") 130, and a presentation system 140.

In an embodiment of FIG. 1, the FMS 110 may perform a variety of functions performed to help the crew in the management of the flight; these functions are known to those skilled in the art. These functions could include receiving a flight plan and constructing a lateral and vertical flight path from the flight plan. A pilot could create a flight plan by entering waypoints stored in a database or select a flight plan stored in a database of the FMS 110; also, the flight plan could be received and loaded into the FMS 110 automatically through a datalink system known to those skilled in the art. Also, a flight plan may be modified at any time. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

In a lateral flight plan, the FMS 110 could perform many functions including, but not limited to, navigational computations, radio navigation aids selections, and providing lateral flight information which could maintain the aircraft along the flight plan from takeoff to approach. In a vertical flight plan, the FMS 110 could compute an optimum speed at each point, other characteristic speeds, and the aircraft weight and center of gravity. Then, it could compute predictions along the flight plan based on these speeds, weight, and environmental/atmospheric conditions. It could also provide vertical flight information in reference to such predictions. Other miscellaneous performance computations are also made. Computations and underlying algorithms performed by the FMS 110 are known to those skilled in the art.

A pilot or flight crew may initialize the FMS 110 including, but not limited to, the selection of a flight plan, where such flight plan could provide the basis for all computations and displays. A flight plan may be composed of various lateral and vertical elements that may be defined during initialization, and may be defined from navigation data stored in an FMS database.

Lateral elements of a flight plan could include origin airport and runway; a departure procedure ("DP") that may include, but is not limited to, a standard instrument departure ("SID"); an enroute transition; enroute airways and waypoints; an arrival procedure that may include, but is not limited to, an enroute transition, a standard terminal arrival route ("STAR") procedure, a STAR-approach transition, an approach procedure, a missed approach procedure, and a holding procedure; and a flight plan to an alternate airport. Such procedures may be defined by various legs and waypoints between legs.

Vertical elements could include a takeoff altitude which may include, but is not limited to, a thrust reduction and/or acceleration altitudes; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels. A vertical element could also include a cost index for the flight plan, a parameter that may determine flight time cost in units of fuel flow for providing fuel cost versus time cost information. The cost index could include a scale of optimization, where a low cost index may be associated with optimizing fuel consumption and a high cost index may be associated with optimizing time.

As noted above, a flight plan may be changed or revised at any time after initialization. For lateral elements, waypoints could be inserted or deleted, holding procedures could be inserted or modified, legs to fly directly to waypoints may be inserted, a DP or STAR procedure may be modified or introduced into the flight plan, the destination or alternate airport may be changed, and/or an offset path could be created to avoid hazardous meteorological conditions. For vertical elements, constraints associated with altitude, vertical speed, flight path angle, and speed between waypoints could be inserted, modified, or deleted; climb and descent speeds could be inserted, modified, or deleted as well as climb and descent step legs. Cruise flight levels and a cost index could be modified.

With respect to vertical elements, the FMS 110 may compute various speeds or mach numbers for the purpose of predicting time and fuel consumption. The predictions made by the FMS 110 may be based on phase of flight profiles using assumptions based on pre-computed allowances and may not take into account an actual flight profile established when an autopilot is engaged. The following brief discussion regarding the use of prediction profiles for the various phases of flight is provided for the purpose of illustration only and not of limitation.

A prediction profile of a take-off phase of flight may assume an aircraft is flown with maximum take-off thrust at a specific speed until a thrust reduction altitude is reached. This could be followed with a prediction profile assuming the aircraft is flown with maximum climb thrust at a specific setting is used until an acceleration altitude is reached. Then, a prediction profile of a climb phase may assume the aircraft is flown with maximum climb thrust from the acceleration altitude until a climb speed selected by the pilot or aircrew is reached or the lower of an optimum speed, a climb speed limit, or a speed constraint is reached, thereby satisfying speed limits or constraints imposed upon the climb phase prediction profile; the pilot may select a speed using a device of a pilot interface system 120 as discussed below. As embodied herein, the FMS 110 could receive data input from other aircraft systems including, but not limited to, data representative of one or more flight modes and/or parameters from a pilot interface system 120.

Figure 2:
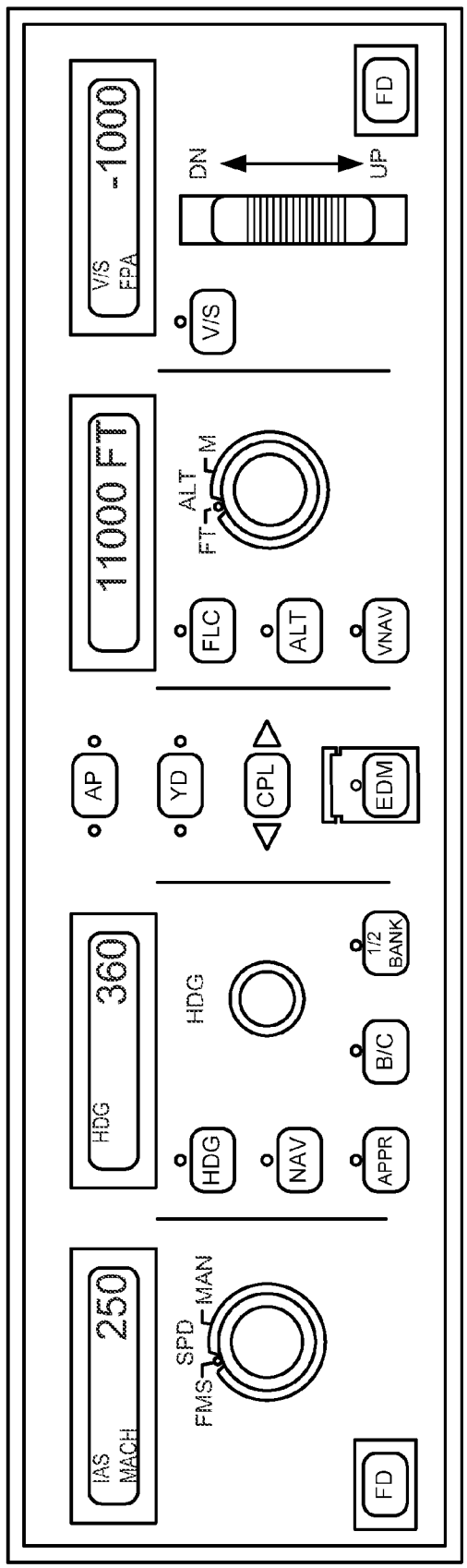
FIG. 2 provides for exemplary illustration of a flight control panel.

FIG. 2 depicts an exemplary illustration of a flight control panel ("FCP") 122, which could be a device of a pilot interface system 120. It is known to those skilled in the art that the FCP 122 may come in many shapes, sizes, and configurations. The FCP 122 depicted in FIG. 2 is provided as an exemplar of a cockpit panel having flight mode and/or parameter selection devices including a knob, pushbutton switches, rotary switches and a thumbwheel. Such devices may be used by the pilot to select or choose the flight mode and/or parameters. Also, such devices may be used to engage an aircraft's autoflight system. As embodied herein, the FCP 122 could represent any device of the pilot interface system 120 from which the pilot may choose to make such selection and/or engagement, and although the following discussion will be drawn to the FCP 122, the pilot interface system 120 is not limited to the FCP 122.

The FCP 122 depicts a flight mode and/or a parameter selection device associated with lateral and vertical flight modes. As shown in FIG. 2, lateral flight mode selection devices include the knob and switches under the window with the HDG 360 indication ("heading window"). The HDG rotary knob may provide the means with which the pilot may select a heading; the selected heading may appear in the heading window. A heading mode could be engaged by pressing the HDG pushbutton switch, where such engagement may provide the autoflight system with roll guidance information to capture and track the heading selected in the window. A navigation mode could be engaged by pressing the NAV pushbutton switch, where such engagement may provide the autoflight system with roll guidance information to capture and track the lateral commands provided by the FMS 110. An approach mode, backcourse mode, and a half-bank mode could be engaged by pressing the APPR, B/C, and ½ BANK pushbutton switches, respectively, where such engagement may provide the autoflight system with roll guidance information to capture and track a localizer, to capture and track the backcourse of a localizer, and to reduce the roll limits of the system, respectively.

Vertical flight modes and/or parameter selection devices include those switches under the windows with the indications of IAS-MACH 250 ("speed window"), 11000 FT ("altitude window"), and V/S-FPA-1000 ("vertical speed window"). The SPD rotary switch under the speed window may provide the means with which the pilot may select a speed from two sources of speed including, but not limited to, a climb speed. By selecting FMS with the SPD rotary switch, an FMS speed hold mode could be engaged, where the climb speed could be limited to the lower of an optimum speed, a climb speed limit, or a speed constraint imposed by the FMS 110 through the use of the climb phase prediction profile as discussed above. By selecting MAN with the SPD rotary switch, a manual speed hold mode could be engaged, where the climb speed could be selected by a pilot and used by the FMS 110 for prediction purposes; the selected speed parameter may appear in the speed window. A concentric knob may provide the means with which the pilot may select a speed; the selected speed may appear in the speed window. The FD pushbutton switch may enable the depiction of a flight director ("FD") providing vertical and lateral guidance information to a visual display unit 142 of the presentation system 140. It should be noted that the indications of IAS and MACH will not normally be displayed simultaneously in the speed window.

The ALT rotary switch under the altitude window may provide the means with which the pilot may select the unit of measurement for altitude, i.e., feet (FT) or meters (M). A concentric knob may provide the means with which the pilot may select an altitude; the selected altitude may appear in the altitude window. A flight level change ("FLC") mode could be engaged by pressing the FLC pushbutton switch, where such engagement may provide the autoflight system with pitch guidance to climb or descend towards the selected altitude at either a preprogrammed reference speed or capturing and tracking the speed indicated in the speed window. An altitude select mode could be engaged by pressing the ALT pushbutton switch, where such engagement may provide the autoflight system with pitch guidance to capture and track the selected altitude. A VNAV mode could be engaged by pressing the VNAV pushbutton switch, where such engagement may provide the autoflight system with pitch guidance provided by a source of vertical guidance including, but not limited to, the FMS 110. By selecting the FLC mode or ALT mode, the autopilot may control the vertical path of the aircraft using the selected modes and not an active flight route computed by the FMS 110 using a prediction profile.

A vertical speed mode could be engaged by pressing the V/S pushbutton switch under the vertical speed window, where such engagement may provide the autoflight system with pitch guidance to hold the vertical speed (or flight path angle if configured with FPA) selected in the window, where the means of selecting the vertical speed is provided with the DN-UP (i.e., down-up) thumbwheel knob. By selecting the V/S parameter, the autopilot may control the vertical path of the aircraft using the selected parameter and not the active flight route computed by the FMS 110 using a prediction profile. The FD pushbutton switch may enable the depiction of an FD providing vertical and lateral guidance information on a second visual display unit 142 of the presentation system 140. It should be noted that the indications of V/S and FPA will not normally be displayed simultaneously in the vertical speed window.

The pushbutton switches AP, YD, CPL, and EDM in the center of FCP 122 may provide the means for the pilot to engage the autopilot, yaw damper, couple the autopilot with a navigation signal and/or air data sensors, and an emergency descent mode, respectively.

In an embodiment of FIG. 1, the EG 130 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The EG 130 may be driven by the execution of software or computer instruction code containing algorithms developed for the specific functions embodied herein. The EG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the EG 130 could be a processor(s) used by or in conjunction with any other system of the aircraft including, but not limited to, the FMS 110, the pilot interface system 120, the presentation system 140, or any combination thereof.

The EG 130 may be programmed or configured to receive as input data representative of information obtained from various systems and/or sources including, but not limited to, the FMS 110, and the pilot interface system 120. As embodied herein, the terms "programmed" and "configured" are synonymous. The EG 130 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The EG 130 may be programmed or configured to execute one or both of the methods discussed in detail below. The EG 130 may be programmed or configured to provide output data to various systems and/or units including, but not limited to, the presentation system 140.

The presentation system 140 could be comprised of a visual display unit 142 and/or an aural advisory unit 144 for presenting the pilot with FMS event strips of the event-based flight management system 100. As embodied herein, the visual display unit 142 may include a vision system (not shown) which generates an image data set which represents the image displayed on a display unit. Vision systems could include, but are not limited to, a synthetic vision system ("SVS"), an enhanced vision system ("EVS"), and/or a combined SVS-EVS.

The visual display unit 142 could be comprised of, but not limited to, a Primary Flight Display, Navigation Display, Head-Down Display, Head-Up Display, Multipurpose Control Display Unit, Engine Indicating and Crew Alerting System, Electronic Centralized Aircraft Monitor, Multi-Function Display, Side Displays, and Data Link Control Display Unit. As embodied herein, the disclosures may apply to a portable device(s) including, but not limited to, tablets which employ a visual display unit and/or an aural advisory unit.

The aural advisory unit 144 may be any unit capable of producing aural advisories. Aural advisories may be discrete sounds, tones, and/or verbal statements used to annunciate a condition, situation, or event. In one embodiment, an aural advisory could call out the approaching and/or reaching of an FMS event(s) corresponding to a lateral mode action and/or a vertical mode action as disclosed below.

The advantages and benefits of the embodiments discussed herein may be illustrated by providing an example of an air traffic control clearance. For the purpose of this example, a flight plan has been filed with the Federal Aviation Administration ("F.A.A."), the aviation-governing authority for the United States. In this example, it is assumed that the departure airport is The Eastern Iowa Airport ("KCID") in Cedar Rapids, Iowa and the destination airport is Eppley Airfield ("KOMA") in Omaha, Nebr. In response, it is assumed that the F.A.A. has issued an air traffic control clearance which clears the aircraft fly at an altitude of FL 280 (i.e., 28,000 feet mean sea level ("MSL")) from KCID to KOMA via (1) Des Moines VORTAC ("DSM") and (2) LANTK intersection ("LANTK INT") via the DSM Transition of the LANTK One Arrival STAR (collectively, "DSM.LANTK1"); for this example, DSM.LANTK1 will require the aircraft to fly via the DSM R-267 (i.e., the radial transmitted from the DSM in the direction of 267 degrees) to LANTK INT, crossing LANTK INT at an altitude of 16,000 feet MSL; from over LANTK INT, the aircraft flies at a heading of 250 degrees and expects radar vectors to a final approach course of a runway at KOMA. The clearance of this example also specifies a required time of arrival ("RTA") at LANTK INT 16:15Z. As embodied herein, this information may be entered into the FMS 110 manually or loaded automatically through a datalink.

Given this information, the FMS 110 may be programmed with a route manager function from which lateral and vertical elements of the flight plan stated in the clearance may be constructed by techniques known to those skilled in the art. The lateral elements are comprised of a first lateral leg formed in between the lateral waypoints KCID and DSM, a second lateral leg formed in between the lateral waypoints DSM and LANTK, and a third lateral leg originating from the lateral waypoint LANTK in the direction of 250 degrees; until radar vector(s) have been received, the third lateral leg does not have a terminating lateral waypoint. The vertical elements are comprised of a first vertical leg formed in between the altitude constraints of 869 MSL (the elevation of KCID) and FL 280, a second vertical leg formed in between the altitude constraints of FL 280 and 16,000 feet MSL, and a third vertical leg originating from the altitude constraint of 16,000 feet MSL; until radar vector(s) have been received, the third vertical leg does not have a terminating altitude constraint.

The route manager function could also be programmed to construct time and/or speed constraint(s) by techniques known to those skilled in the art. In the clearance, a time constraint of 16:15Z may be constructed for LANTK INT. Although a speed constraint has not been specified in the clearance, other speed constraints could exist. For example, an aviation-governing authority could implement speed constraints through the use of regulations such as, but not limited to, an airspeed restriction of 250 knots imposed by the F.A.A. for aircraft operating less than 10,000 feet MSL.

The route manager function could also include special procedures by techniques known to those skilled in the art, where such special procedures could be implemented by a manufacturer and/or end-user and/or comprised of other vertical and lateral elements such as those discussed above. For example, the special procedures could include, but not be limited to, thrust reduction and/or acceleration altitudes, cost indexing, and/or phase of flight prediction profile(s).

Once the preceding functions have been performed, the route manager could define route elements as ground tracks, vertical constraints, speed constraints, and time constraints of the active flight route utilizing techniques known to those skilled in the art. If the FMS 110 is configured to receive information corresponding to aircraft-performance parameters (e.g., fuel loads, center of gravity, passenger load, cargo load, scheduled thrust settings, default speeds, aircraft configuration, etc. . . . ) and environmental and/or meteorological factors (e.g., winds, temperatures, pressures, etc. . . . ), the route manager could utilize techniques known to those skilled in the art to accurately construct an aircraft active flight route performance model for predicting the latitude, longitude, speed, and altitude at any point along the active flight route of the clearance.

Figure 3:
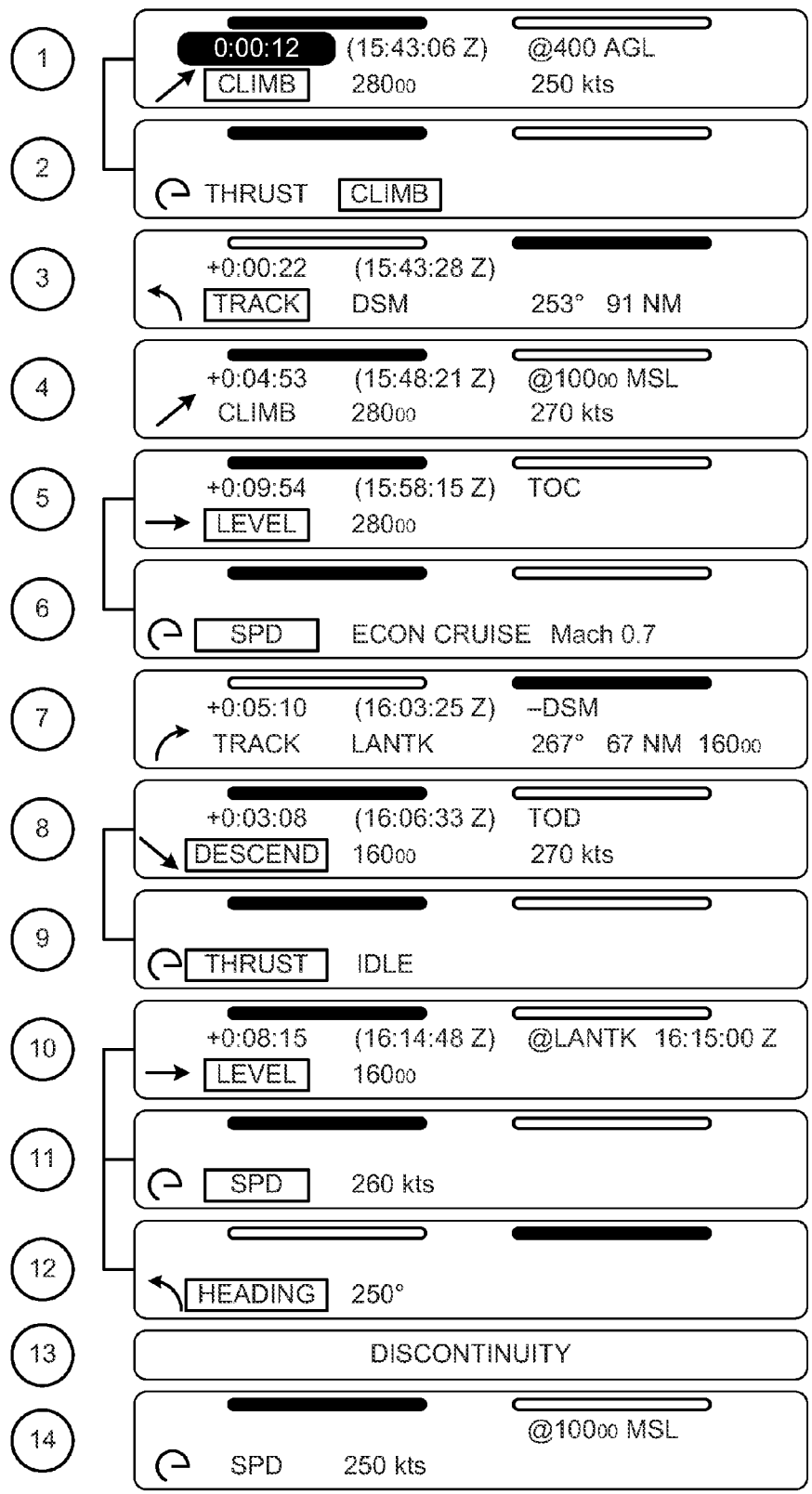
FIG. 3 depicts a sequence of FMS event strips for an active flight route.

The advantages and benefits of the embodiments discussed herein may be illustrated by showing how the novel techniques disclosed herein may be adopted by the EG 130 to construct and/or generate a sequence of future lateral, vertical, and speed events for presenting a timeline of events provided by the FMS 110 (singularly, "FMS event"). FIG. 3 provides exemplary depictions of FMS event strips presented in sequence on one or more visual display units 142 to provide a timeline of FMS events that the pilot may encounter during the flight between KCID and KOMA.

Referring to Strip No. 1, there are three rows. The top row may be comprised of text and/or icons corresponding to an action of a lateral mode or a vertical mode. As shown in Strip No. 1, the top row is comprised of two rectangular icons: the right rectangle indicates a lateral mode action, and the left rectangle indicates a vertical mode action, where each mode could correspond to a mode of the pilot interface system 120 such as, but not limited to, the FCP 122. The second row may be comprised of a first time and/or a second time, where the first time may be expressed as a time-to-go ("TTG") or a time in between sequential FMS events (those events that are not pending), and the second time may be expressed as a Coordinated Universal Time ("UTC"). As shown in Strip No. 1, the first time is comprised of a TTG, and the second time is comprised of UTC; in addition, a condition upon which the event is based is provided. The third row may be comprised of icon(s) and/or text of an FMS event and information corresponding to the event. As shown in Strip No. 1, the FMS event is comprised of both an icon and text along with additional information regarding the FMS event.

Strip No. 1 indicates a vertical mode action (indicated in the top row) comprised of the vertical FMS event of CLIMB to FL 280 at a speed of 250 knots (indicated in the third row) and scheduled to commence in 12 seconds at 15:43:06Z, the calculated time when the aircraft will reach a height of 400 above ground level ("AGL") (as indicated in the second row); the time is made conspicuous to indicate the next event in sequence. A magenta border around CLIMB indicates a change from the previous vertical FMS event (assumed to be TAKEOFF) of the vertical mode action; as embodied herein, magenta is indicative of active flight route event.

Strip No. 2 indicates a vertical mode action comprised of the speed/thrust FMS event of THRUST at which time the thrust will be set to the CLIMB thrust rating value (indicated in the third row). As indicated by the left hand bracket to the left of Strip Nos. 1 and 2 (and the absence of a second row), the FMS event of Strip No. 2 is linked to the FMS event of Strip No. 1 such that both events are scheduled for the same time. An absence of a border around THRUST and the presence of a magenta border around CLIMB respectively indicates no change from the previous speed/thrust mode (assumed to be THRUST) but a change to a CLIMB thrust rating (from an assumed TAKEOFF thrust rating) of the vertical mode action.

Strip No. 3 indicates a lateral mode action (indicated in the top row) comprised of the lateral FMS event of TRACK to DSM at 253 degrees for a distance of 91 nautical miles ("NM") (indicated in the third row) and scheduled to commence in 22 seconds after Strip Nos. 1 and 2 at 15:48:21Z (as indicated in the second row). A magenta border around TRACK indicates a change from the previous lateral FMS event (assumed to be TAKEOFF) of the lateral mode action.

Strip No. 4 indicates a vertical mode action comprised of the vertical FMS event of CLIMB at which time the FMS 110 will set the speed target to 270 knots and scheduled to commence in 4 minutes 53 seconds after Strip No. 3 at 15:48:21Z, the calculated time when the aircraft will reach 10,000 feet MSL. An absence of a border around CLIMB indicates no change from the previous vertical FMS mode of Strip No. 1.

Strip No. 5 indicates a vertical mode action comprised of the vertical FMS event of LEVEL at FL 280 and scheduled to commence in 9 minutes 54 seconds after Strip No. 4 at 15:58:15Z, the calculated time when the aircraft will reach the top of climb ("TOC") at FL280. A magenta border around LEVEL indicates a change from the previous vertical FMS event of CLIMB of Strip No. 1.

Strip No. 6 indicates a vertical mode action comprised of the speed/thrust FMS event of SPD at which time the speed will be set to the ECON CRUISE (i.e., economy cruise speed value) corresponding to a speed of Mach 0.7. As indicated by the left hand bracket to the left of Strip Nos. 5 and 6, the FMS event of Strip No. 6 and the FMS event of Strip No. 5 are scheduled for the same time. A magenta border around SPD indicates a change from the previous speed/thrust FMS event of THRUST of Strip No. 2.

Strip No. 7 indicates a lateral mode action comprised of the lateral FMS event of TRACK to LANTK at 267 degrees for a distance of 67 NM and having an altitude constraint of 16,000 feet MSL and scheduled to commence a turn anticipation in 5 minutes 10 seconds after Strip Nos. 5 and 6 at 16:03:25Z prior to arriving at DSM (as indicated by the "-" appearing in front of "DSM"). An absence of a border around TRACK indicates no change from the previous lateral FMS event of TRACK in Strip No. 3.

Strip No. 8 indicates a vertical mode action comprised of the vertical FMS event of DESCEND to 16,000 feet MSL at a speed of 270 knots and scheduled to commence in 3 minutes 8 seconds after Strip No. 7 at 16:06:33Z as the aircraft reaches, the calculated time when the aircraft will reach the top of descent ("TOD"). A magenta border around DESCEND indicates a change from the previous vertical FMS event of LEVEL of Strip No. 5.

Strip No. 9 indicates a vertical mode action comprised of the speed/thrust FMS event of THRUST at which time the thrust will be set to IDLE. As indicated by the left hand bracket to the left of Strip Nos. 8 and 9, the FMS event of Strip No. 9 and the FMS event of Strip No. 8 are scheduled for the same time. A magenta border around THRUST indicates a change from the previous speed/thrust FMS event of SPD in Strip No. 6.

Strip No. 10 indicates a vertical mode action comprised of the vertical FMS event of LEVEL at 16,000 feet MSL and scheduled to commence in 8 minutes 15 seconds after Strip Nos. 8 and 9 at 16:14:48Z, the calculated time when the aircraft will reach LANTK having an RTA of 16:15Z. A magenta border around LEVEL indicates a change from the previous vertical FMS event of DESCEND of Strip No. 8.

Strip No. 11 indicates a vertical mode action comprised of the speed/thrust FMS event of SPD at which time the speed target will be set to 260 knots by the FMS 110. As indicated by the left hand brackets to the left of Strip Nos. 10, 11, and 12, the FMS events of Strip Nos. 10, 11, and 12 are scheduled for the same time. A magenta border around SPD indicates a change from the previous speed/thrust FMS event of THRUST of Strip No. 9.

Strip No. 12 indicates a lateral mode action comprised of the lateral FMS event of HEADING at which time the heading will be set to 250 degrees by the FMS 110. A magenta border around HEADING indicates a change from the previous lateral FMS event of TRACK of Strip No. 7.

Strip No. 13 indicates a discontinuity of the active flight route of the clearance because, pursuant to DSM.LANTK1, radar vectors to a final approach course of a runway at KOMA will be provided after the aircraft crosses over LANTK at an altitude of 16,000 feet MSL. When the final approach course is learned and provided to the FMS 110 along with other vectoring instructions, the discontinuity strip may be removed and replaced with FMS event strips of lateral mode and vertical mode actions corresponding to the instructions.

Strip No. 14 indicates a vertical mode action comprised of the speed/thrust FMS event of SPD in which the speed will be set to 250 knots by the FMS prior to reaching 10,000 feet MSL (a speed regulation imposes by the F.A.A.); however, the time at which the aircraft will be cleared to descend to 10,000 feet MSL is unknown (as indicated by the absences of the first and second times). When the aircraft receives clearance to descend below 10,000 feet MSL, the blanks may be replaced with calculated absolute and UTC times and placed in sequence with the other FMS strips.

It has been assumed for the purpose of illustration that the vertical and lateral mode actions of the FMS event strips discussed in FIG. 3 have been generated without manual lateral and vertical flight mode selections being made via the FCP 122. With respect to the lateral action modes, the pilot did not manually select a heading in the heading window of the FCP 122 or press the HDG pushbutton switch to engage the heading (i.e., lateral) mode. With respect to the vertical action modes, the pilot did not (1) select MAN of the SPD rotary switch and manually select a speed in the speed window, (2) engage the ALT pushbutton and manually select an altitude in the altitude window, or (3) engage the V/S pushbutton and manually select a vertical speed in the vertical speed window.

Figure 4A:
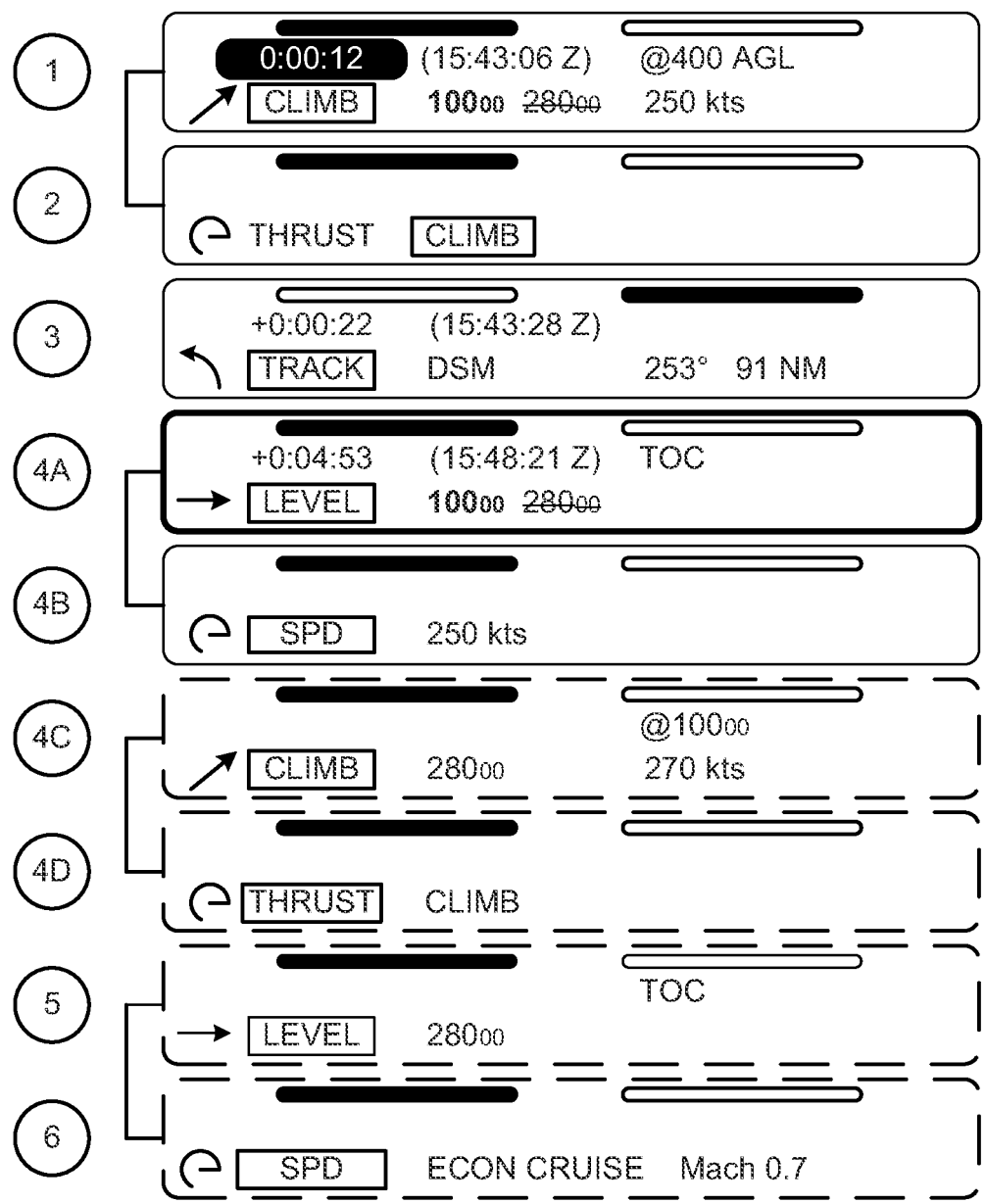
FIG. 4A depicts the sequence of FMS event strips shown in FIG. 3 for which a pilot has manually engaged a vertical flight mode.
Figure 4B:
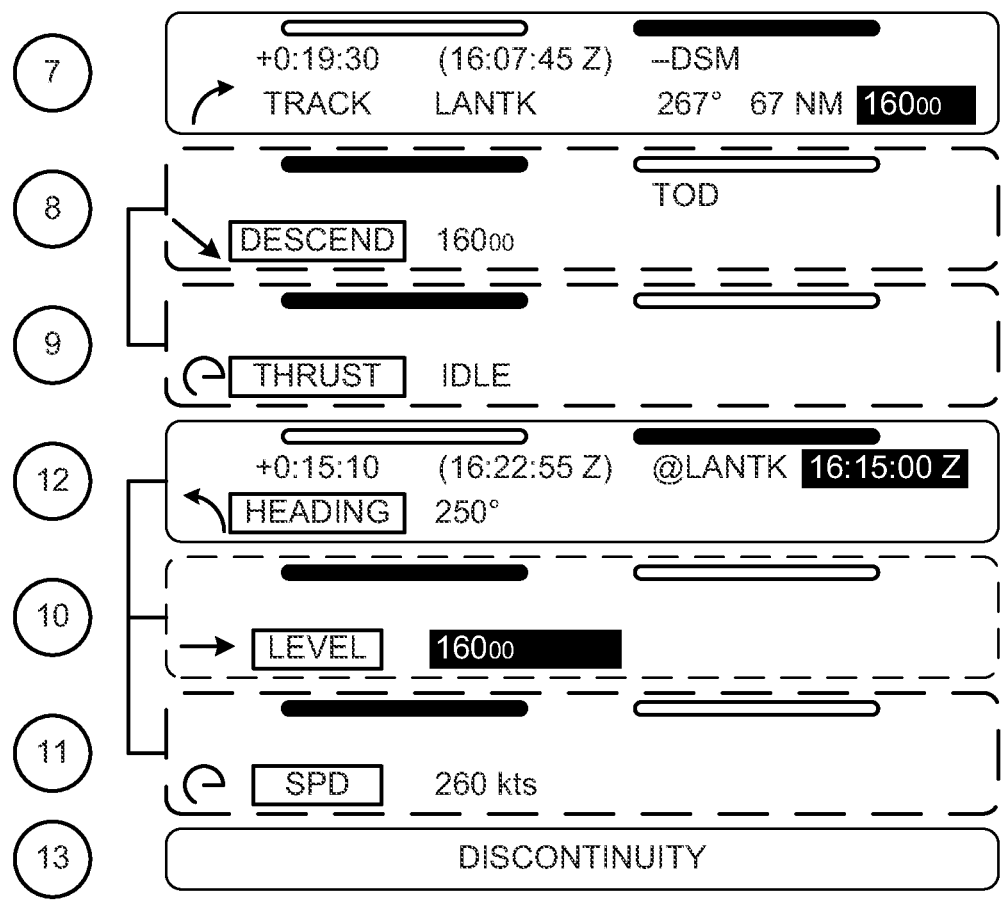
FIG. 4B continues the depiction of the sequence of FMS event strips shown in FIG. 4A.

In the example of FIGS. 4A and 4B, assume that air traffic control has issued a revised clearance and the pilot has manually selected an altitude of 10,000 feet MSL. Similar to FIG. 3, FIGS. 4A and 4B provide exemplary depictions of FMS event strips presented in sequence on one or more visual display units 142 to provide a timeline of FMS events that the pilot may encounter during the flight between KCID and KOMA after the pilot has manually selected an altitude of 10,000 feet MSL.

Strip No. 1 indicates a vertical mode action comprised of the vertical FMS event of CLIMB to 10,000 feet MSL at a speed of 250 knots and scheduled to commence in 12 seconds at 15:43:06Z, the calculated time when the aircraft will reach a height of 400 AGL; the time is made conspicuous to indicate the next event in sequence. A magenta border around CLIMB indicates a change from the previous vertical FMS event (assumed to be TAKEOFF) of the vertical mode action. Also, the target altitude of FL 280 of the active flight route remains visible with a strikethrough added to indicate that the altitude is currently unavailable. In addition, the bold font of the numeral 10000 indicates the color of cyan to indicate the FMS event is a "manual intervention" of the active flight route; as embodied herein, cyan is indicative of manual selection or a result of manual intervention.

Strip Nos. 2 and 3 remain the same and are unchanged from FIG. 3. Strip No. 4A indicates a vertical mode action comprised of the vertical FMS event of LEVEL at 10,000 feet MSL and scheduled to commence in 4 minutes 53 seconds after Strip No. 3 at 15:48:21Z, the calculated time when the aircraft will reach the TOC at 10,000 feet MSL set by the pilot. A magenta border around LEVEL indicates a change from the previous vertical FMS event of CLIMB of Strip No. 1. Also, the bold font of the numeral 10000 indicates the color of cyan and the target altitude of FL 280 of the active flight route remains visible with a strikethrough. In addition, the thicker border around Strip No. 4A is indicative of the color of cyan to indicate the FMS event is a "manual intervention" of the active flight route.

Strip No. 4B indicates a vertical mode action comprised of the speed/thrust FMS event of SPD at which time the speed target will be set to the 250 knots by the FMS 110. As indicated by the left hand bracket to the left of Strip Nos. 4A and 4B, the FMS event of Strip No. 4A and the FMS event of Strip No. 4B are scheduled for the same time. A magenta border around SPD indicates a change from the previous speed/thrust FMS event of THRUST of Strip No. 2.

Strip No. 4C indicates a pending vertical mode action comprised of the vertical FMS event of CLIMB to FL 280 at a speed of 270 knots; it is a "pending" mode because the time at which the climb will commence is currently unknown and/or unavailable as indicated by the absence of times in the time row. A dashed border around Strip No. 4C is indicative of the color magenta to indicate a pending FMS event, and a magenta border around CLIMB indicates a change from the previous vertical FMS event of LEVEL of Strip No. 4A.

Strip No. 4D indicates a pending vertical mode action comprised of the speed/thrust FMS event of THRUST at which time the thrust will be set to the CLIMB rating; however, a time at which the climb will commence is currently unknown and/or available. As indicated by the left hand bracket to the left of Strip Nos. 4C and 4D, the FMS event of Strip No. 4C and the FMS event of Strip No. 4D are scheduled for the same time (although the time is unknown). A magenta border around THRUST indicates a change from the previous speed/thrust FMS event of SPD of Strip No. 4B.

Strip No. 5 indicates a pending vertical mode action comprised of the vertical FMS event of LEVEL at FL 280. A magenta border around Strip No. 5 indicates a pending FMS event, and a magenta border around LEVEL indicates a change from the previous vertical FMS event of CLIMB of Strip No. 4C.

Strip No. 6 indicates a pending vertical mode action comprised of the speed/thrust FMS event of SPD at which time the speed will be set to ECON CRUISE corresponding to a speed of Mach 0.7. A magenta border around Strip No. 6 indicates a pending FMS event. As indicated by the left hand bracket to the left of Strip Nos. 5 and 6, the FMS event of Strip No. 6 and the FMS event of Strip No. 5 are scheduled for the same time. A magenta border around SPD indicates a change from the previous speed/thrust FMS event of THRUST of Strip No. 4D.

Referring to FIG. 4B, Strip No. 7 indicates a lateral mode action comprised of the lateral FMS event of TRACK to LANTK at 267 degrees for a distance of 67 NM and having an unavailable altitude constraint of 16,000 feet MSL and scheduled to commence a turn anticipation in 19 minutes 30 seconds after Strip No. 4A at 16:07:45Z prior to arriving at DSM; the altitude constraint of 16,000 feet MSL of the active flight route is made conspicuous to indicate that the altitude constraint imposed by DSM.LANTK1 is currently unavailable. An absence of a border around TRACK indicates no change from the previous lateral FMS event of TRACK in Strip No. 3.

Strip No. 8 indicates a pending vertical mode action comprised of the vertical FMS event of DESCEND to 16,000 feet MSL. A magenta border around Strip No. 8 indicates a pending FMS event, and a magenta border around DESCEND indicates a change from the previous vertical FMS event of LEVEL of Strip No. 5.

Strip No. 9 indicates a pending vertical mode action comprised of the speed/thrust FMS event of THRUST at which time the thrust will be set to IDLE. A magenta border around Strip No. 9 indicates a pending FMS event. As indicated by the left hand bracket to the left of Strip Nos. 8 and 9, the FMS event of Strip No. 9 and the FMS event of Strip No. 8 are scheduled for the same time. A magenta border around THRUST indicates a change from the previous speed/thrust FMS event of SPD in Strip No. 6.

Strip No. 12 indicates a lateral mode action comprised of the lateral FMS event of HEADING at which time the heading will be set to 250 degrees by the FMS 110 and scheduled to commence in 15 minutes 10 seconds after Strip No. 7 at 16:22:55Z given the current speed of 250 knots. Strip No. 12 appears before Strip Nos. 10 and 11 because of the uncertainty of these pending events. The time constraint of 16:15:00Z of the active flight route is made conspicuous to indicate an inability to comply with the time constraint imposed in the clearance, and the altitude constraint of 16,000 feet MSL is made conspicuous to indicate that the altitude constraint imposed by DSM.LANTK1 is currently unavailable. A magenta border around HEADING indicates a change from the previous lateral FMS event of TRACK of Strip No. 7.

Strip No. 10 indicates a vertical mode action comprised of the vertical FMS event of LEVEL at 16,000 feet MSL. As indicated by the left hand brackets to the left of Strip Nos. 10, 11, and 12, the FMS events of Strip Nos. 10, 11, and 12 are scheduled for the same time. A magenta border around Strip No. 10 indicates a pending FMS event, and a magenta border around LEVEL indicates a change from the previous vertical FMS event of DESCEND of Strip No. 8.

Strip No. 11 indicates a pending vertical mode action comprised of the speed/thrust FMS event of SPD at which time the speed target will be set to 260 knots by the FMS 110. A magenta border around Strip No. 11 indicates a pending FMS event. A magenta border around SPD indicates a change from the previous speed/thrust FMS event of THRUST of Strip No. 9.

Strip No. 13 remains the same and is unchanged from FIG. 3. Strip No. 14 of FIG. 3 does not appear in FIG. 4 because there is no change from the previous speed/thrust FMS event of SPD in Strip No. 4B.

Figure 5:
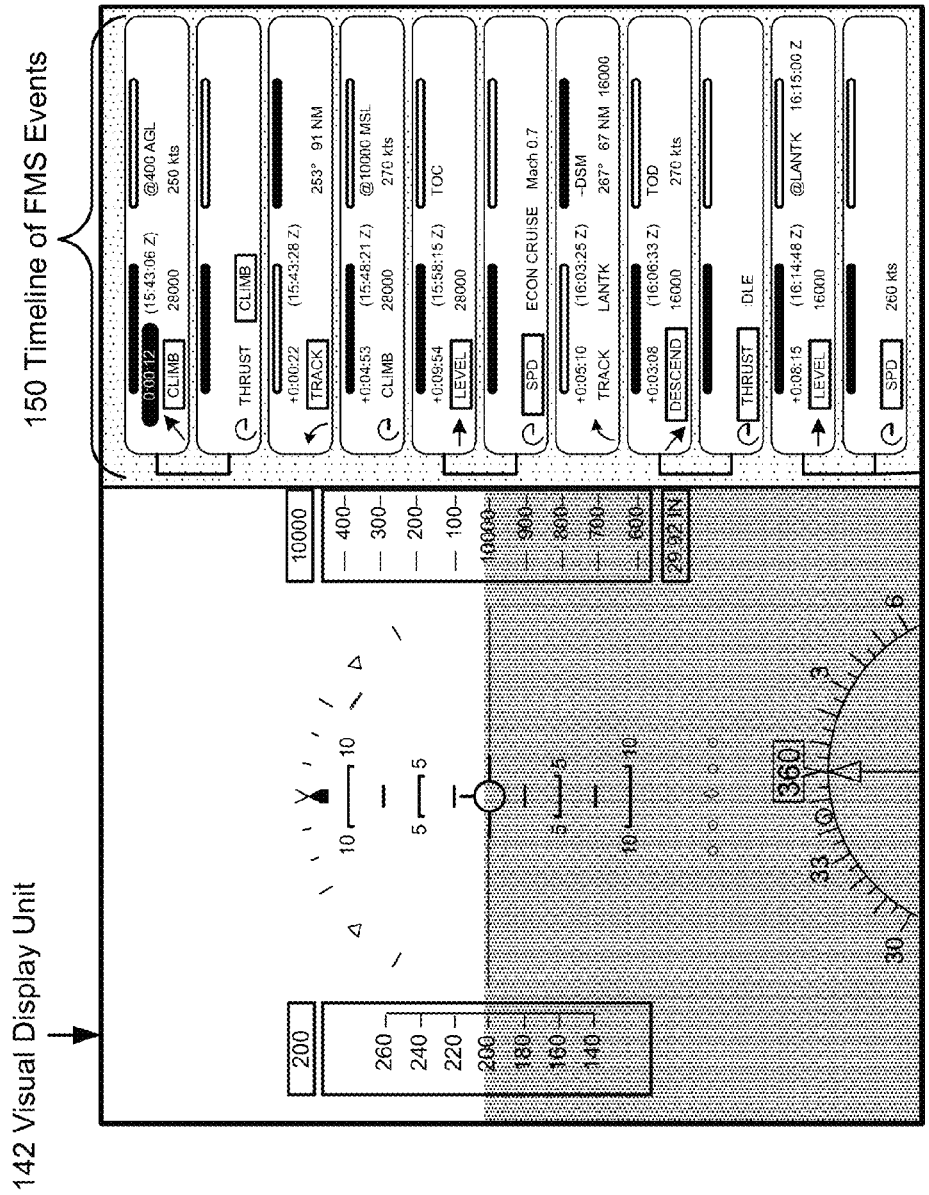
FIG. 5 illustrates a sequence of FMS event strips displayed on a visual display unit.

In an embodiment of FIG. 5, an example is provided of how the series of FMS strips disclosed herein may be presented on the visual display unit 142. As the flight progresses, the FMS strips could scroll upwards as each event FMS event passes. As shown in FIG. 5, the visual display unit 142 is illustrated which, for the purpose of illustration and not of limitation, is configured as a classic PFD which could be representative of an indicator provided a egocentric synthetic image of the scene located outside the aircraft that has been generated by an SVS. As illustrated, the visual display unit 142 could be configured to share its screen space with the timeline of FMS events 150.

It should be noted that the methods described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. An event-based flight management system, such system comprising:
a source of flight management data comprised of a flight management system ("FMS");
an event generator configured to
receive flight management data representative of at least one future vertical mode action or future lateral mode action, where
each future vertical mode action and each future lateral mode action is comprised of one FMS event,
generate event data representative of at least one flight management strip, where
each flight management strip is
informative of no more than one first FMS event, and
comprised of a plurality of rows, where
a first row is reserved for the display of at least one commencement time for the first FMS event, and
a second row is vertically disposed from the first row and reserved for the display of first visual information indicative of the first FMS event, where
the first row does not display a commencement time for the first FMS event when at least one commencement time for at least one second FMS event is the same as at least one commencement time for the first FMS event; and
provide the event data to a presentation system; and
the presentation system configured to
receive the event data, whereby
each flight management strip represented in the event data is presentable on at least one visual display unit.

2. The system of claim 1, wherein
each future vertical mode action is comprised of
one vertical FMS event, or
one speed/thrust FMS event, and
each future lateral mode action is comprised of
one lateral FMS event.

3. The system of claim 1, wherein
the first row displays at least one commencement time for the first FMS event for each commencement time that is available, or
the first row does not display a commencement time for the first FMS event when a commencement time for the first FMS event is not available.

4. The system of claim 1, wherein
the at least one commencement time for the first FMS event is expressed as
a time-to-go,
a time in between sequential FMS events, or
a coordinated universal time.

5. The system of claim 1, wherein the display of first visual information corresponding to the first FMS event is comprised of an icon, text, or both.

6. The system of claim 1, wherein
a third row is vertically disposed from the first row and the second row and reserved for the display of second visual information indicative of a future vertical mode or a future lateral mode, where
the visual information is comprised of an icon, text, or both.

7. The system of claim 1, wherein at least one visual display unit is comprised of a visual display of a portable electronic device.

8. An event-based flight management device, such device comprising:
an event generator configured to
receive flight management data representative of at least one future vertical mode action or future lateral mode action, where
each future vertical mode action and each future lateral mode action is comprised of one FMS event;
generate event data representative of at least one flight management strip, where
each flight management strip is
informative of no more than one first FMS event, and
comprised of a plurality of rows, where
a first row is reserved for the display of at least one commencement time for the first FMS event, and
a second row is vertically disposed from the first row and reserved for the display of first visual information indicative of the first FMS event, where
the first row does not display a commencement time for the first FMS event when at least one commencement time for at least one second FMS event is the same as at least one commencement time for the first FMS event; and
provide the event data to a presentation system, whereby
each flight management strip represented in the event data is presentable on at least one visual display unit.

9. The device of claim 8, wherein
each future vertical mode action is comprised of
one vertical FMS event, or
one speed/thrust FMS event, and
each future lateral mode action is comprised of
one lateral FMS event.

10. The device of claim 8, wherein
the first row displays at least one commencement time for the first FMS event for each commencement time that is available, or
the first row does not display a commencement time for the first FMS event when a commencement time for the first FMS event is not available.

11. The device of claim 8, wherein
the at least one commencement time for the first FMS event is expressed as
a time-to-go,
a time in between sequential FMS events, or
a coordinated universal time.

12. The device of claim 8, wherein
a third row is vertically disposed from the first row and the second row and reserved for the display of second visual information indicative of a future vertical mode or a future lateral mode, where
the visual information is comprised of an icon, text, or both.

13. An event-based flight management method, such method comprising:

receiving flight management data representative of at least one future vertical mode action or future lateral mode action, where
- each future vertical mode action and each future lateral mode action is comprised of one FMS event;

generating event data representative of at least one flight management strip, where
- each flight management strip is
  - informative of no more than one first FMS event, and
  - comprised of a plurality of rows, where
    - a first row is reserved for the display of at least one commencement time for the first FMS event, and
    - a second row is vertically disposed from the first row and reserved for the display of first visual information indicative of the first FMS event, where
      - the first row does not display a commencement time for the first FMS event when at least one commencement time for at least one second FMS event is the same as at least one commencement time for the first FMS event; and providing the event data to a presentation system, whereby
- each flight management strip represented in the event data is presentable on at least one visual display unit.

14. The method of claim 13, wherein
each future vertical mode action is comprised of
- one vertical FMS event, or
- one speed/thrust FMS event, and each future lateral mode action is comprised of
- one lateral FMS event.

15. The method of claim 13, wherein
the first row displays at least one commencement time for the first FMS event for each commencement time that is available, or the first row does not display a commencement time for the first FMS event when a commencement time for the first FMS event is not available.

16. The method of claim 13, wherein
the at least one commencement time for the first FMS event is expressed as
- a time-to-go,
- a time in between sequential FMS events, or
- a coordinated universal time.

17. The method of claim 13, wherein
a third row is vertically disposed from the first row and the second row and reserved for the display of second visual information indicative of a future vertical mode or a future lateral mode, where
- the second visual information is comprised of an icon, text, or both.

* * * * *